United States Patent
Bradfield et al.

(10) Patent No.: US 9,092,395 B2
(45) Date of Patent: Jul. 28, 2015

(54) PROVIDE AN APPLIANCE LIKE TEST VEHICLE FOR IT DISASTER RECOVERY

(71) Applicant: International Business Machines Corporation, Armonk, NY (US)

(72) Inventors: Andrew J. Bradfield, Cortlandt Manor, NY (US); Paul Canevari, Poughkeepsie, NY (US); Kenneth W. Fleck, Hurley, NY (US); Robert Maher, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 13/721,979

(22) Filed: Dec. 20, 2012

(65) Prior Publication Data

US 2014/0181572 A1    Jun. 26, 2014

(51) Int. Cl.
*G06F 11/00* (2006.01)
*G06F 11/20* (2006.01)
*G06F 11/26* (2006.01)
*G06F 11/14* (2006.01)

(52) U.S. Cl.
CPC ............ *G06F 11/20* (2013.01); *G06F 11/1464* (2013.01); *G06F 11/2023* (2013.01); *G06F 11/261* (2013.01)

(58) Field of Classification Search
CPC ..... G06F 11/20; G06F 11/14; G06F 11/1456; G06F 11/1464; G06F 11/16; G06F 11/2023; G06F 11/203; G06F 11/2046; G06F 11/26; G06F 11/261
USPC ................................ 714/4.11, 4.1, 6.2, 25, 43
See application file for complete search history.

(56) References Cited

U.S. PATENT DOCUMENTS

| | | | |
|---|---|---|---|
| 6,732,294 B2 * | 5/2004 | Mackrory et al. | 714/25 |
| 7,213,022 B2 | 5/2007 | Whelan et al. | |
| 7,363,365 B2 | 4/2008 | Ocko et al. | |
| 7,770,057 B1 | 8/2010 | Graham et al. | |
| 7,770,058 B2 | 8/2010 | Phan | |
| 7,953,703 B2 | 5/2011 | Aggarwal et al. | |
| 8,112,657 B2 | 2/2012 | Greenberg | |
| 8,738,958 B2 * | 5/2014 | Goroff et al. | 714/4.1 |
| 8,843,780 B1 * | 9/2014 | Roy | 714/4.11 |
| 2006/0190766 A1 | 8/2006 | Adler et al. | |
| 2006/0193263 A1 * | 8/2006 | Vanamamalai et al. | 370/241 |
| 2007/0168692 A1 | 7/2007 | Quintiliano | |
| 2009/0319699 A1 * | 12/2009 | Canto et al. | 710/17 |
| 2011/0095495 A1 * | 4/2011 | Fan et al. | 280/30 |
| 2011/0107140 A1 * | 5/2011 | Bish et al. | 714/6.2 |
| 2011/0296423 A1 * | 12/2011 | Elnozahy et al. | 718/102 |
| 2012/0060050 A1 | 3/2012 | Mehta et al. | |
| 2012/0117422 A1 | 5/2012 | Radhakrishnan | |
| 2012/0130956 A1 | 5/2012 | Caputo | |
| 2013/0007741 A1 * | 1/2013 | Britsch et al. | 718/1 |

* cited by examiner

*Primary Examiner* — Joseph D Manoskey
(74) *Attorney, Agent, or Firm* — Cantor Colburn LLP; Steven Chiu

(57) ABSTRACT

A high availability/disaster recovery appliance test vehicle that contains a preconfigured high availability/disaster recovery solution for quick implementation at a test environment. The hardware and software components may be preconfigured with test applications and data and all the necessary networking, SAN and operating system requirements. This single shippable rack can be used to certify a multi site high availability/disaster recovery architecture that supports both local and site failover and site to site data replication. The unit is plug and play which reduces the effort required to begin the evaluation and reduces the number of IT teams that need to be involved. An apparatus and method for implementing the above high availability/disaster recovery vehicle are provided.

12 Claims, 2 Drawing Sheets

PROVIDE AN APPLIANCE LIKE TEST VEHICLE FOR IT DISASTER RECOVERY

BACKGROUND OF THE INVENTION

1. Field of the Invention

This invention relates to the field of information technology disaster recovery, and in particular to portable test systems for testing disaster recovery solutions.

2. Description of the Related Art

IT organizations are increasingly searching for and analyzing solutions that will protect their data and increase their business service recovery time in the event of disruption to their IT infrastructure. These events are often caused by weather related catastrophes but are also caused by unexpected infrastructure outages and possibly acts of bad intent.

Choosing the right solutions can be a very expensive and time consuming process that can add years of delay to the actual deployment of a Disaster Recovery (DR) solution. Understanding the integration points of business applications and how they share and exchange data is a factor in the design which leads to the requirement to prioritize business applications. These classifications or tiers are then used to design DR solutions on a tier by tier basis.

At some point a requirement for anyone of these tiers is to prototype the hardware and software configuration using actual applications and test data. Often the hardware and software components of any given High Availability (HA) or Disaster Recovery (DR) solution are new or unfamiliar to the IT organization and the implementation process required to evaluate the design gets drawn out or even canceled due to complexity and time. More time and effort is spent on building the evaluation environment rather than on the key focus areas which are application recovery and data protection.

Another drawback of building a custom test environment for HA/DR evaluations is the number of teams required in the effort and the coordination required to design and implement a successful project. A typical HA/DR evaluation project requires networking, server, operating system, storage, virtualization and service management skills.

The main problem with all of the above points is that it is difficult to realize an HA/DR solution quickly based on the complexity of the setup (spanning multiple sites) and the number or organizations required to oversee the environment.

SUMMARY OF THE INVENTION

According to an aspect of the invention, a mobile apparatus for simulated disaster recovery testing in a distributed computing environment at a physical test environment is provided. The apparatus includes: a plurality of servers, wherein a first server simulated a first simulated geographical site. The first server is assigned the role of primary server and a second server simulates a second geographical site. The second server is designated a backup server to the primary server. Also included is a high availability module configured to: assign the role of primary server to the first server and the role of backup server to the second server; monitor the health of the entire two site high availability cluster including resources such as networks, disks, IP addresses and applications; effect data synchronization between the first server and the backup server; detect failure of the primary server; and responsive to detecting failure of the primary server, perform failover from the primary server to the backup server. The apparatus also includes an electronic Storage Area Network (SAN) configured to communicate with the first and second servers wherein the failover module controls bidirectional data replication between separate storage units associated with the first and second server.

According to another aspect of the invention, a method for facilitating testing of computer system failover process in a distributed computing environment is provided. The method includes configuring a first server to simulate a first simulated geographical site, the first server assigned the role of primary server; and configuring a second server simulating a second simulated geographical site, the second server designated a backup server to the primary server. The method further includes configuring a high availability module to: assign the role of primary server to the first server and the role of backup server to the second server; monitor the health of the entire two site high availability cluster including resources such as networks, disks, IP addresses and applications; effect data synchronization between the first server and the backup server; detect failure of the primary server and responsive to detecting failure of the primary server, perform failover from the primary server to the backup server; and configuring an electronic Storage Area Network (SAN) to communicate with the first and second servers wherein the failover module controls bidirectional data replication between separate storage units associated with the first and second server and connecting the servers and storage area network to a mobile device such that the device provides a fully functional system capable of simulating a geographically dispersed disaster recovery infrastructure.

DETAILED DESCRIPTION OF THE PREFERRED EMBODIMENTS

Figure 1:
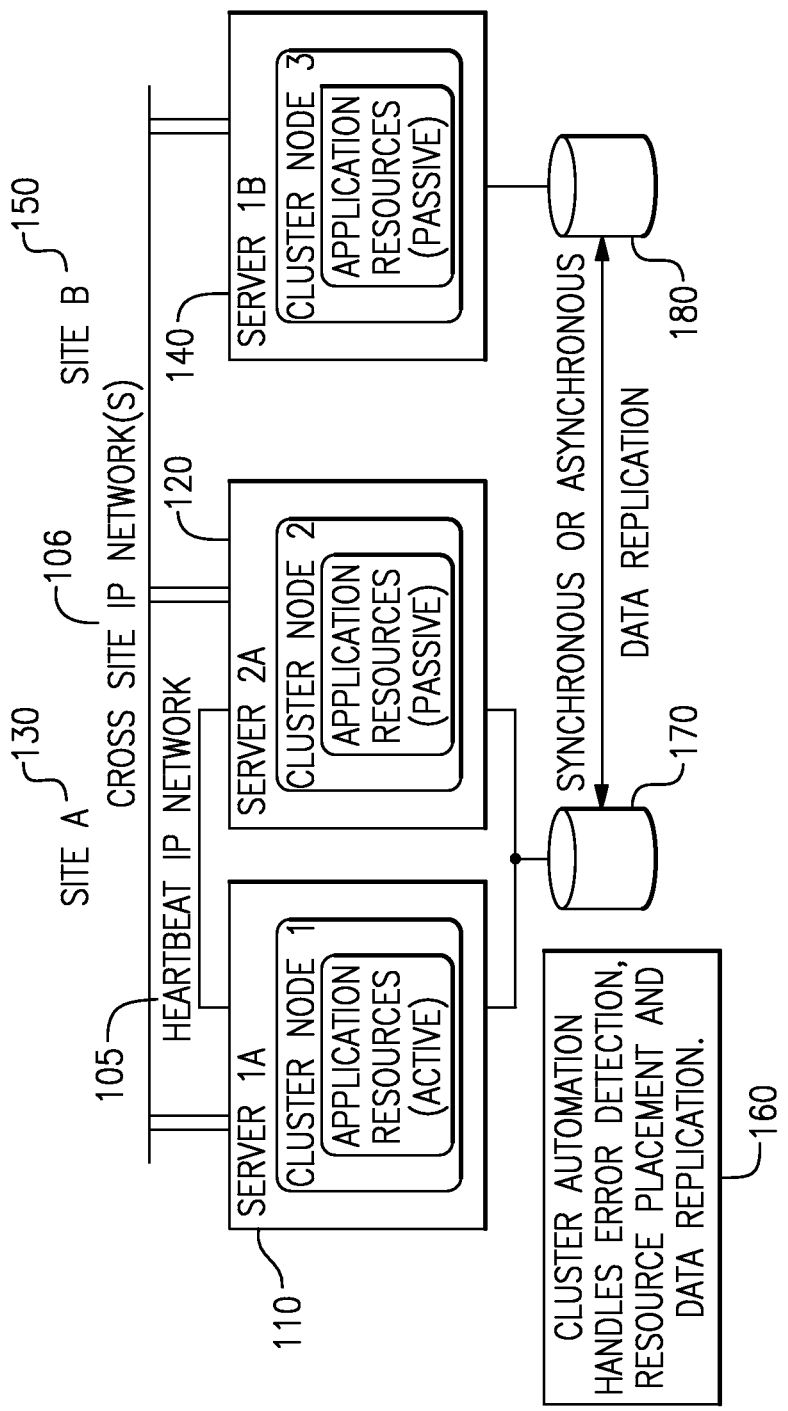
FIG. 1. depicts a logical view of a test vehicle

This invention describes the advantages of an HA/DR appliance test vehicle that contains a preconfigured HA/DR solution. The hardware and software components with pre-configured with test applications and data and all the necessary networking, SAN and operating system requirements. This single shippable rack can be used to certify a multi site HA/DR architecture that supports both local and site failover and site to site data replication. An additional benefit is that the unit is plug and play which reduces the effort required to begin the evaluation and reduces the number of IT teams that need to be involved.

An embodiment provides a solution that will allow an IT organization to deploy a test environment that requires minimal setup while supporting application integration and DR testing. The solution also will allow for tweaking of the Recovery Time Objective and Recovery Point Objective values during the execution phase. This disclosure is addressing the issue of complexity that lengthens the evaluation phase by providing a quick DR deployment test vehicle. The mobile HA/DR test vehicle may include Fully functional multi-tiered application, Multi-site simulation, Servers at each simulated site, Networking to support local and site communication, networking to support data replication, storage at each site and cluster automation and monitoring.

For example a mobile DR test vehicle can ships to a client pre-loaded with a test application and data. The high availability cluster and the disk replication configuration is also pre-configured. This eliminates the need for complex custom setup of the DR environment by the client and allows for faster deployment of a DR test environment in a company's datacenter. In addition, the test vehicle is fully open which allows for quick integration of client applications and data above and beyond what ships with the test vehicle. The test vehicle virtual machine configuration and the pre-defined cluster can also be modified on-site to meet the needs of the client. Other benefits include using a time delay network emulator, site to site failover across long distances can be emulated and tested. The test vehicle can be returned with client data and applications so they can be used in additional more robust and custom benchmarking that provide both high security and scalability. The additional scaling will prove that the HA/DR solution works in an environment that meets the requirements of the client production workload. For the service provider, this also provides a fast rebuild process to return the appliance back to a gold master level once returned and before shipment to the next client.

The embodiment delivers servers, networking and storage in a single rack that is delivered to a client's site for evaluation purposes. The mobile test vehicle allows client's to test the HA/DR capabilities of the offering using a pre-packaged application suite along with an easy to use front-end tool. A client can evaluate a pre-configured client-server application that includes a backend database. The client also has the opportunity to tailor the environment to their specific needs by redesigning the logical partition layout and loading their own applications and data if desired. The DR focused test vehicle will provide a pre-configured multi-site high availability cluster and the data mirroring storage configuration. A preferred embodiment of this invention is a two site cluster as described below. The event detection and the automation will be provided and demonstrated through a HA cluster software package.

An embodiment of the mobile vehicle for simulated disaster recovery testing in a distributed computing environment may include a plurality of servers. One of the servers is assigned the role of primary server by the HA software module which is included with the mobile test vehicle configuration. The role of primary server can move to secondary servers at the simulated local site or to a pre-configured server at the simulated DR site. The role switching is all controlled by the HA module which reacts to planned and unplanned events such as component failures or complete site outages.

The mobile apparatus includes a Storage Area Network (SAN) at both simulated sites with a sufficient amount of external storage to support both the application that is included and additional space for client use. An important factor is the data replication that is provided between the storage units located at each simulated site. The data replication is the key to the automated DR solution and provides the mechanism to move the workload from one site to another. The replication is bi-directional which allows for site failovers in both directions.

The failover module may be configured to monitor the health of the entire two site HA cluster including all resources such as networks, disks, IP addresses and applications.

The HA module will first attempt to relocate resources locally as the first option and will only promote the event to site failover when all local failover options have been exhausted. As part of a site failover the HA module will automatically switch the role of the disks at the DR from "target mode" to server mode which allows them to be accessed by a server at the DR site. Once the disks are brought online at the DR site the HA module will continue the resource bring up by mounting required file systems, configuring the virtual IP address needed for client connections and finally starting the application.

FIG. 100 shows a logical view of an exemplary embodiment. The environment being simulated is a two site configuration with 2 servers, 110 and 120 at site A 140 and 1 server 130 at site B 150. Servers 1A and 2A are connected via a Heartbeat IP network 180 monitors the state of cluster nodes using a specific set of cluster network interfaces. These heartbeats rings help identify cluster resource failures and the presence of multiple heartbeat rings greatly reduces the risk of a partitioned cluster. A partitioned or split brain cluster state creates a situation where all cluster nodes attempt to own the cluster resources simultaneously. The use of multiple heartbeat networks and preferably both IP and non-IP heartbeat networks is preferred.

Server 1A 110 is shown as the active cluster node in the three node two site cluster. This implies that 110 currently owns the Resource Group and all of the resources associated with the resource group. The set of resource that make up a resource group are typically virtual IP addresses, disks, filesystems and application scripts need to support the starting and stopping of the application being managed by the cluster. The two "passive" cluster nodes are active cluster nodes but in the current state do not own any resource groups. Their role at this point is to take over the Resource Group in the case of a failure. Server 2A 120 is providing local failover at SiteA 130 in the case of a local resource failure such as a server or virtual machine issue. Server 1B 140 is providing remote failover to SiteB 150 in the case of a SiteA failure event such a datacenter wide outage.

In both cases of failover, local or remote, the HA cluster software 160 will manage the stopping and starting of the resource group as part of the failover. In the case of the remote site failover the HA cluster software will communicate to the SVC clusters which manage the external disks 170 and 180.

The cluster nodes in SiteA heartbeat over the disk subsystem in addition to the IP heartbeat network. This configuration supports both local and site failover of the application. This configuration supports both local and site failover of the application. The data model at site A 130 is a shared disk configuration managed by the HA cluster software and the replication to site B 150 is either synchronous or asynchronous through the disk subsystem. Site A and Site B are connected via Cross Site IP Network 106. The storage is actually in the rack and is logically separated so that there are disks 170 assigned to site A and other disks 180 assigned to site B. When the application transaction running at Site A 130 writes to disk 170, the disk subsystem (actually the SAN Volume Controller (SVC)) replicates the data to site B 150 by replication with disk 180. That way when a DR event occurs and the application is moved to Site B 150 by the cluster software has access to the latest transaction data.

The error detection, resource placement, activation, direction and de-activation of the replication is managed by the HA cluster software, Power System PowerHA clustering software. This software runs on all OS images so there isn't the concept of an external manager. The communicate via heartbeats and service events. The disk subsystem in sites A and B are both virtualized using the IBM SAN Volume Controller (SVC). The SVC was chosen because is supports multiple disk subsystem vendors and more importantly provides the cross site data replication capability. The SVC supports both synchronous and asynchronous replication which can configured on the mobility rack prior to shipment. The replication mode can also be changed while on site at the client location to provide testing capability in all modes. A shared disk is utilized by the two site A cluster nodes as a non-IP heartbeat disk to provide additional protecting against a partitioned cluster.

A hot site DR solution involves deployment of servers, storage, networks, applications and most likely availability software packages at two geographically dispersed locations. In the case of a hot site DR solution, which is the focus of this invention, a disaster recovery site is maintained with the hardware, software and personnel required to takeover the processing capability from the primary site in a very short period of time. That period of time is referred to as the Recovery Time Objective (RTO) and plays heavily into the final design. The other common DR point of contention and likely more important consideration is the Recovery Point Objective (RPO) which identifies the recovery objective in regard to how much data can be lost in the advent of a DR condition. These two factors greatly influence the time needed to prototype a solution using real applications and data.

Figure 2:
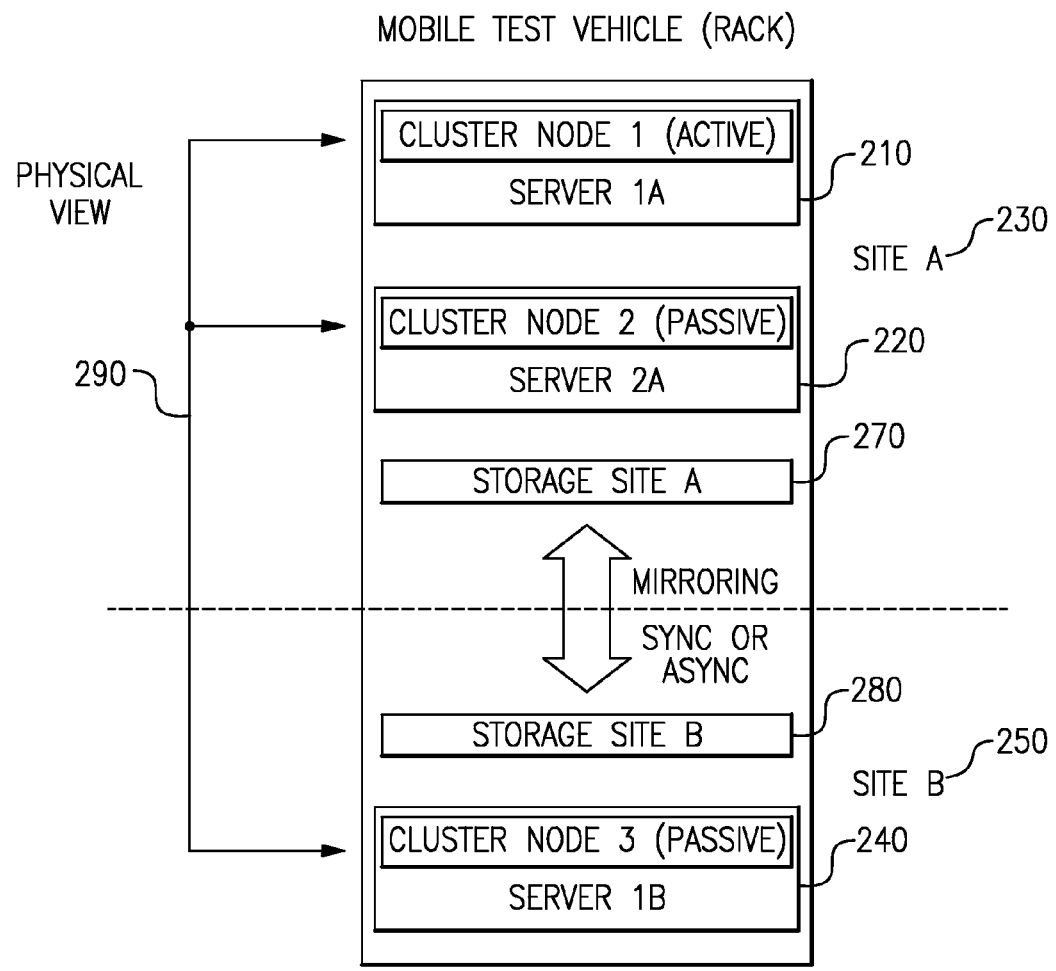
FIG. 2. depicts a physical view of a test vehicle

FIG. 2 shows a physical view of a single mobile rack which includes the servers and storage (shown) but also includes all network and san switches required to complete the HA/DR configuration.

Server 1A 210 is shown as the active cluster node in the three node two site cluster. 210 currently owns the Resource Group and all of the resources associated with the resource group which include virtual IP addresses, disks, filesystems and application scripts need to support the starting and stopping of the application being managed by the cluster. The two "passive" cluster nodes are active cluster nodes but in the current state do not own any resource groups. Their role at this point is to take over the Resource Group in the case of a failure. Server 2A 220 is providing local failover at Site A 230 in the case of a local resource failure such as a server or virtual machine issue. Server 1B 240 is providing remote failover to SiteB 150 in the case of a SiteA failure event such a datacenter wide outage. In the mobile test rack, Sites A and Sites B represent geographically dispersed locations which would provide failover across geographically dispersed failover facilities. The embodiment allows for testing of disaster recovery solutions from a local facility.

In both cases of failover, local or remote, the HA cluster software will manage the stopping and starting of the resource group as part of the failover. The software runs on servers 210, 220 and 240. In the case of the remote site failover the HA cluster software will communicate to the SVC clusters which manage the electronic data storage 270 for site A and electronic data storage 280 for site B.

The cluster nodes in SiteA heartbeat over the disk subsystem in addition to the IP heartbeat network. This configuration supports both local and site failover of the application. The data model at site A 230 is a shared disk configuration managed by the HA cluster software and the replication to site B 250 is either synchronous or asynchronous through the disk subsystem.

The storage 270 and 280 is actually in the rack and is logically separated. When the application transaction running at Site A 230 writes to storage 270, the disk subsystem (actually the SAN Volume Controller (SVC)) replicates the data to site B 250 by replication with storage 280. That way when a DR event occurs and the application is moved to Site B 250 by the cluster software has access to the latest transaction data. The error detection, resource placement, activation, direction and de-activation of the replication is managed by the HA cluster software, Power System PowerHA clustering software. This software runs on all OS images so there isn't the concept of an external manager and communication is via heartbeats and service events. The disk subsystem in sites A and B are both virtualized using the IBM SAN Volume Controller (SVC). The SVC was chosen because is supports multiple disk subsystem vendors and more importantly provides the cross site data replication capability. The SVC supports both synchronous and asynchronous replication which can be configured on the mobility rack prior to shipment. The replication mode can also be changed while on site at the client location to provide testing capability in all modes. A shared disk is utilized by the two site A cluster nodes as a non-IP heartbeat disk to provide additional protecting against a partitioned cluster.

Examples of test cases that can be run using the DR test vehicle include but are not limited to: Operating system failure, Server hardware outage, Disk subsystem outage, Complete site failure, Component failures such as network or SAN adapters, Planned Maintenance scenarios for: Server firmware, OS patching, and Middleware patching.

A prototype of this invention was built in the IBM Poughkeepsie Benchmark Center in order to meet client requirements that testing be at their datacenter rather than at the Poughkeepsie BMC. Another goal was to help introduce as many clients as possible to the solutions IBM has around HA/DR on the Power System platform. We used IBM hardware and software products in the project and made choices based on our goal to provide a single shippable self contained rack. Another goal of the project was to make the startup up time and effort at the client site minimal and quick. The only required connection is power to the rack and if desired a network connection from the network switch in our rack to the clients network infrastructure. The network connection to the client's network infrastructure is not required but is provided for easy access.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application, and to enable others of ordinary skill in the art to understand the invention through various embodiments and the various modifications thereto which are dependent on the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A mobile apparatus for simulated disaster recovery testing in a distributed computing environment at a physical test environment, the apparatus comprising:

a plurality of servers configured as a high availability cluster, a first server simulating a first simulated geographical site, the first server assigned the role of primary server and a second server simulating a second geographical site, the second server designated a backup server to the primary server wherein the plurality of servers is preconfigured with test applications and data prior to delivery to the test environment;

a high availability module configured to:
   assign the role of primary server to the first server and the role of backup server to the second server;
   monitor the health of the entire two site high availability cluster including resources including at least one of networks, disks, IP addresses and applications;
   effect data synchronization between the first server and the backup server;
   detect failure of the primary server;
   responsive to detecting failure of the primary server, perform failover from the primary server to the backup server; and an electronic Storage Area Network (SAN) configured to communicate with the first and second servers wherein the failover module controls bidirectional data replication between separate storage units associated with the first and second server, wherein the storage area network is preconfigured with test applications and data prior to delivery to the test environment.

2. The apparatus of claim 1 wherein the assignment of primary server is transferred by the high availability module to the secondary server at the test environment or to a third pre-configured server at the test environment.

3. The apparatus of claim 1, further comprising means for connecting to an existing computer network.

4. The apparatus of claim 1, wherein the servers are based on IBM® Power Systems.

5. The apparatus of claim 1, wherein the high availability module is based on an IBM Storage Area Network Volume Controller.

6. The apparatus of claim 1, further comprising at least one additional server to simulate multiple geographical backup sites.

7. A method for facilitating testing of computer system failover process in
   a distributed computing environment comprising:
     configuring a first server to simulate a first simulated geographical site, the first server assigned the role of primary server
     configuring a second server simulating a second simulated geographical site, the second server designated a backup server to the primary server;
   configuring a high availability module to:
     assign the role of primary server to the first server and the role of backup server to the second server;
     monitor the health of the entire two site high availability cluster including resources including at least one of networks, disks, IP addresses and applications;
     effect data synchronization between the first server and the backup server;
     detect failure of the primary server and
     responsive to detecting failure of the primary server, perform failover from the primary server to the backup server; and
   configuring an electronic Storage Area Network (SAN) to communicate with the first and second servers wherein the failover module controls bidirectional data replication between separate storage units associated with the first and second server; and
   attaching the servers and storage area network to a mobile device such that the device provides a fully functional system capable of simulating a geographically dispersed disaster recovery infrastructure.

8. The method of claim 7 further comprising assigning, by the high availability module, the role of primary server from the first server to the second at the test environment or to a third pre-configured server at the test environment.

9. The method of claim 7, further comprising configuring at least one additional server to simulate multiple geographical backup sites.

10. The method of claim 7, further comprising means for connecting to an existing computer network.

11. The method of claim 7, wherein the servers are based on IBM® Power Systems.

12. The method of claim 7, wherein the high availability module is based on the IBM Storage Area Network Volume Controller.

\* \* \* \* \*